A. P. LINK.
BOILER.
APPLICATION FILED NOV. 9, 1909.
1,055,284.
Patented Mar. 4, 1913.
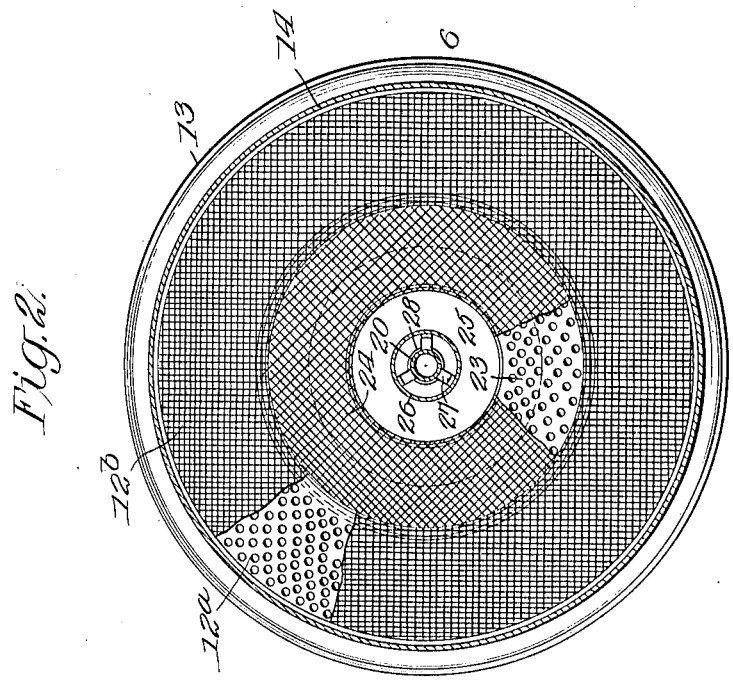
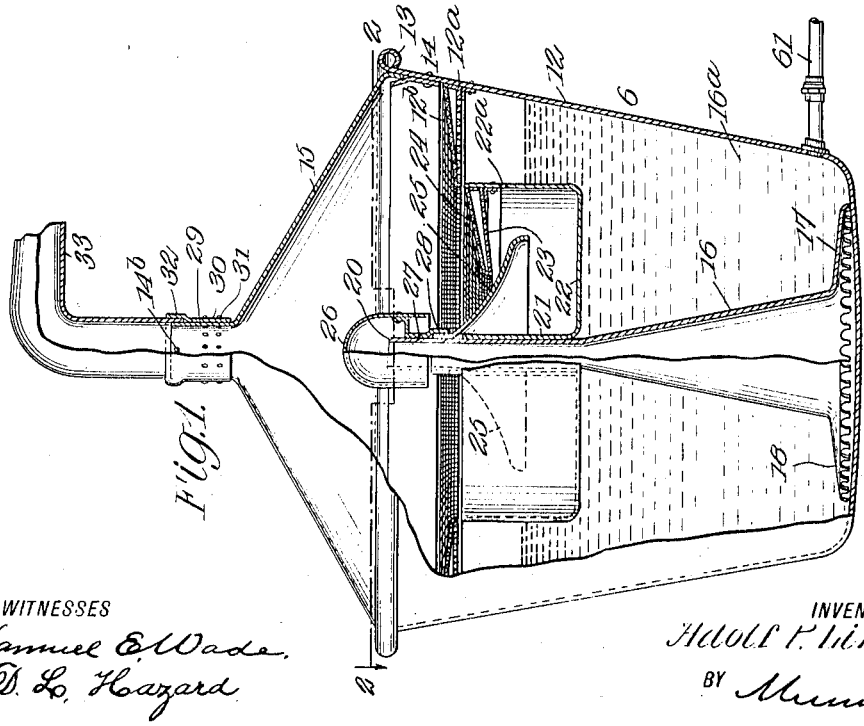
WITNESSES
Samuel E. Wade.
D. L. Hazard
INVENTOR
Adolf P. Link
BY Munn & Co.
ATTORNEYS

UNITED STATES PATENT OFFICE.

ADOLF P. LINK, OF NEW YORK, N. Y.

BOILER.

1,055,284.     Specification of Letters Patent.     Patented Mar. 4, 1913.

Application filed November 9, 1909. Serial No. 526,949.

*To all whom it may concern:*

Be it known that I, ADOLF P. LINK, a citizen of the United States, and a resident of the city of New York, borough of Brooklyn, in the county of Kings and State of New York, have invented a new and Improved Boiler, of which the following is a full, clear, and exact description.

My invention relates to boilers, my purpose being to improve the general efficiency of apparatus of this kind; the object of the invention being to facilitate the capture and removal of mud or other residuum from within a boiler.

Reference is to be had to the accompanying drawings forming a part of this specification, in which similar characters of reference indicate corresponding parts in the figures.

Figure 1 is a view partly in side elevation and partly in section, showing the apparatus; and Fig. 2 is a horizontal section on the line 2—2 of Fig. 1, looking in the direction of the arrow.

The boiler 6 comprises a pot 12 provided with a rounded rim 13, and mounted within the pot adjacent to this rim is a flange 14. A top 15 is provided for this pot and has generally the form of a frusto-conical dome, the lower edge of this top fitting between the flange 14 and the upper edge of the pot, and thereby forming a substantially air-tight fit. Disposed centrally within the pot 12 is a pipe 16 having generally a frusto-conical shape and provided at its bottom with a flange 17, the edge of this flange being provided with corrugations 18. The pot 12 is provided with screens $12^a$ and $12^b$, as shown in Fig. 1.

The pipe 16 is provided with a cylindrical portion 20 extending upwardly. A pan 22 is provided centrally with a cylindrical portion 21 which fits over the cylindrical portion 20 so that the pan is supported firmly in position. This pan, because of its use, I designate as the mud pan. It is employed to receive the mud thrown up during the operation of boiling, as hereinafter described.

Mounted in the upper portion of the mud pan 22 is an annular screen 23 made preferably of sheet metal provided with openings. Above this screen is another screen 24 made preferably of woven wire. The inner edge of the screen last mentioned is bent downwardly, as indicated in Fig. 1, so as to engage the adjacent inner edge of the screen 23. A deflecting hood 25, having substantially the form of a bell, encircles the cylindrical portion 20 and rests directly upon the cylindrical portion 21.

A dome 26 is, by aid of a spider 27, mounted upon the upper end of the cylindrical member 20 in such manner as not to obstruct this member. The lower end of this spider 27 is provided with a collar 28 which fits directly upon the upper or neck portion of the hood 25.

A liquid $16^a$ is placed within the boiler and heat is applied in the usual manner. If the liquid contains any mud or other impurities of a residual character, they are removed first by overboiling; the heavier impurities, for instance, substances such as mud, often tend to settle near the bottom of a boiler and to become gradually hardened and form a scale unless they are removed. I therefore seek to remove them at an early stage, and more particularly as by so doing the bottom part of the boiler and parts adjacent to the same are kept clean and are thus rendered comparatively easy to heat. The vapor arising from the liquid passes upwardly through the screens $12^a$, $12^b$, and out through the dome 15. Any mud or residuum which may tend to collect in the bottom of the boiler is carried upwardly through the pipe 16 and passes out of the upper end of the cylindrical portion 20 into the dome 26. It cannot travel any higher than this and is turned back, along with any water which will be carried with it, dropping upon the hood 25 and falling into the mud pan. At intervals this mud or other solid residuum is removed. In order to do this, the top 15 is first taken off, the screen $12^b$ is lifted out, the dome 26 and hood 25 are next taken off, and finally the mud pan is removed and the mud, or other residuum is rejected from it. The parts are replaced in inverse order. While the mud thus tends to ascend through the conical pipe 16, this does not prevent the formation of vapor in the body of the liquid $16^a$, and this vapor finds its way upwardly and passes through the screens $12^a$, $12^b$, into the top 15. This top 15 is provided with a neck 29 and encircling the latter is a collar 30 held in position by aid of rivets 31, as will be understood from Fig. 1.

At 14$^b$ (see upper portion of Fig. 1) are small holes for facilitating the return of the water of condensation, and also for preventing the overflow of the liquid upon the outside. The metal screens 12$^a$, 23 break up the bubbles and the fine woven screens prevent excessive foaming and overboiling.

The mud pan 22 is provided with small radially disposed holes, one of which is shown at 22$^a$, for allowing any water of condensation which may happen to get into the pan, to flow out into the boiler 12. Any water which may at any time be contained in the mud pan 22, therefore, has a higher level than that of the liquid 16$^a$ in the boiler. The metal screens 12$^a$, 23 have unobstructed evaporating space, in order to facilitate vaporization and to prevent undue condensation.

The upper edge 32 of the collar 30 bears away slightly from the upper edge of the neck 29 so as to leave an annular space. Fitting into this annular space is the lower end of a vapor pipe 33 for conducting the vapor from the boiler. A pipe 61 is connected with the lower portion of the boiler to supply the same with water, the pipe being connected with a suitable supply for maintaining the level of the liquid in the boiler.

Having thus described my invention, I claim as new and desire to secure by Letters Patent:

1. In combination, a boiler, a pipe mounted centrally therein and provided with an upper cylindrical portion, a pan provided with a portion encircling said cylindrical portion, a screen mounted upon said pan and extending toward the center thereof, and a deflecting hood mounted on the cylindrical portion of said pipe and supported by said pan, the said hood being disposed adjacent to said screen for directing residuum into said pan.

2. In a boiler, a pot, a top removably affixed to said pot, a pipe having a frusto-conical shape disposed within said pot and having a relatively broad base resting on the bottom thereof, a mud pan carried by said pipe and disposed above the upper end thereof, and a series of superimposed screens extending outwardly from the top of said mud pan to the inner side of said pot, whereby the vaporized substance in said pot may pass through said screens and mud ebulliating through said pipe will be siphoned into said mud pan.

3. In a boiler, a pot having a pipe therein, said pipe having a base resting on the bottom thereof, a mud pan carried by said pipe, a deflecting hood encircling said mud pan, and a screen disposed within said mud pan and projecting toward said hood, said hood being disposed below the upper end of said pipe.

4. In a boiler, a pot having an open-end pipe disposed therein, one end of said pipe being in juxtaposition to the bottom of said pot, a dome carried by the opposite upper end of said pipe, a mud pan carried by said pipe below the opening in said dome, and a deflector positioned below said dome within said mud pan, whereby mud ebulliating through said pipe will be deflected by said dome and hood into said mud pan.

5. In a boiler, a pot having an open-end pipe disposed therein, one end of said pipe being in juxtaposition to the bottom of said pot, a dome carried by the opposite upper end of said pipe, a mud pan carried by said pipe below the opening in said dome, and a deflector positioned below said dome within said mud pan, whereby mud ebulliating through said pipe will be deflected by said dome and hood into said mud pan, said mud pan having an opening in the side above the bottom thereof, whereby water of condensation may overflow from said mud pan into said pot.

6. In combination, a boiler, an open end pipe arranged within said boiler, a mud pan mounted centrally on said pipe above the bottom of the boiler, the upper end of said pipe extending above the mud pan, and means carried by said pipe at the upper end thereof for deflecting into the mud pan the material passing through said pipe.

7. In a boiler, a pot, a cover having a centrally disposed outlet therein, the said cover being removably positioned on said pot, a pipe open at both ends, and arranged vertically within the pot, a dome mounted on the upper end of the pipe, and a mud pan mounted on said pipe above the bottom of the pot, the said pipe feeding mud or other residuum from the bottom of said pot to said mud pan.

8. In combination, a boiler, an open end pipe disposed within said boiler and having a flange at its bottom resting on the bottom of the boiler, the edges of the flange being provided with corrugations, a mud pan carried by said pipe above the bottom of the boiler, and a deflecting hood encircling said pipe for deflecting the material passing through said pipe into said mud pan.

9. In combination, a boiler, a mud pan removably positioned in said boiler above the bottom thereof, a screen extending from the top of the mud pan to the inner side of the boiler, an annular screen mounted in the upper portion of the mud pan and means for feeding residuum from the bottom of said boiler to said mud pan.

10. In combination, a boiler, a pipe mounted vertically in said boiler and adapted to receive material at its lower end from the bottom of the boiler and discharge it at its upper end, a mud pan provided centrally with a cylindrical portion fitting on the upper part of said pipe, and means carried by said pipe for deflecting into the mud pan, the material passing through said pipe.

In testimony whereof I have signed my name to this specification in the presence of two subscribing witnesses.

ADOLF P. LINK.

Witnesses:
 WILLIAM BRAND,
 GEO. C. GUTKES.